(12) United States Patent
Yoon et al.

(10) Patent No.: US 12,174,688 B2
(45) Date of Patent: Dec. 24, 2024

(54) METHOD OF CONTROLLING SPECIFIED FUNCTION AND ELECTRONIC DEVICE SUPPORTING SAME

(71) Applicant: SAMSUNG ELECTRONICS CO., LTD., Suwon-si (KR)

(72) Inventors: Jongmin Yoon, Suwon-si (KR); Seungnyun Kim, Suwon-si (KR); Chulkwi Kim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 79 days.

(21) Appl. No.: 18/099,055

(22) Filed: Jan. 19, 2023

(65) Prior Publication Data

US 2023/0161400 A1 May 25, 2023

Related U.S. Application Data

(63) Continuation of application No. PCT/KR2022/004818, filed on Apr. 5, 2022.

(30) Foreign Application Priority Data

Apr. 7, 2021 (KR) ........................ 10-2021-0045491

(51) Int. Cl.
*G06F 1/32* (2019.01)
*G02B 27/01* (2006.01)
(Continued)

(52) U.S. Cl.
CPC ....... *G06F 1/3296* (2013.01); *G02B 27/0176* (2013.01); *G06F 1/1681* (2013.01);
(Continued)

(58) Field of Classification Search
CPC ................. G06F 1/32; G06F 9/44; G06F 1/12
See application file for complete search history.

(56) References Cited

U.S. PATENT DOCUMENTS 9,769,558 B2  9/2017  Chandramohan et al.
9,851,585 B2  12/2017  Ashwood
(Continued)

FOREIGN PATENT DOCUMENTS

KR  10-2011-0044080  4/2011
KR  10-2011-0101944  9/2011
(Continued)

OTHER PUBLICATIONS

International Search Report for PCT/KR2022/004818 mailed Aug. 1, 2022, 5 pages.
(Continued)

*Primary Examiner* — Keshab R Pandey
(74) *Attorney, Agent, or Firm* — Nixon & Vanderhye P.C.

(57) ABSTRACT

According to various embodiments, a first electronic device may include: a body including at least one sensor, a temple connected to the body, a hinge connecting the body and the temple and configured to allow the temple connected to the body to be folded in a specified direction within a specified angle, and a processor functionally connected to the at least one sensor, wherein the processor is configured to: determine whether the first electronic device is in a first state of being mounted in a second electronic device, identify whether the first electronic device is in a second state of being worn, through the at least one sensor, and execute a specified function of the first electronic device, based on at least one of the first state and/or the second state.

18 Claims, 13 Drawing Sheets

(51) Int. Cl.
*G06F 1/16* (2006.01)
*G06F 1/3296* (2019.01)
*G06F 3/147* (2006.01)
*H02J 7/34* (2006.01)
*H04W 76/30* (2018.01)
*G06V 20/20* (2022.01)

(52) U.S. Cl.
CPC .............. *G06F 3/147* (2013.01); *H02J 7/342* (2020.01); *H04W 76/30* (2018.02); *G02B 2027/0178* (2013.01); *G06V 20/20* (2022.01)

(56) References Cited

U.S. PATENT DOCUMENTS

| | | | |
|---|---|---|---|
| 10,379,622 B2 | 8/2019 | Park et al. | |
| 10,534,203 B2 | 1/2020 | Olgun et al. | |
| 10,824,192 B2* | 11/2020 | Guo | G06F 3/0346 |
| 10,866,914 B2* | 12/2020 | Oh | H04L 63/0853 |
| 2010/0079356 A1 | 4/2010 | Hoellwarth | |
| 2011/0096154 A1 | 4/2011 | Nam et al. | |
| 2011/0221746 A1 | 9/2011 | Park et al. | |
| 2015/0015458 A1 | 1/2015 | Cho et al. | |
| 2019/0327594 A1* | 10/2019 | Kim | H04W 4/70 |
| 2020/0089026 A1* | 3/2020 | Mickels | G02C 11/00 |
| 2021/0088810 A1 | 3/2021 | Adams et al. | |
| 2022/0179213 A1 | 6/2022 | Zhou et al. | |
| 2023/0412717 A1* | 12/2023 | Imai | H04M 1/05 |

FOREIGN PATENT DOCUMENTS

| | | |
|---|---|---|
| KR | 10-2014-0008586 | 1/2014 |
| KR | 10-2015-0007129 | 1/2015 |
| KR | 10-2015-0043834 | 4/2015 |
| KR | 10-2015-0085587 | 7/2015 |
| KR | 10-2016-0062263 | 6/2016 |
| KR | 10-2017-0039570 | 4/2017 |
| KR | 10-2017-0067058 | 6/2017 |
| KR | 10-2020-0029592 | 3/2020 |
| KR | 10-2194287 | 12/2020 |

OTHER PUBLICATIONS

Written Opinion of the ISA for PCT/KR2022/004818 mailed Aug. 1, 2022, 4 pages.
International Search Report dated Apr. 5, 2022 in PCTKR2022004818, 4 pages.
Written opinion Report dated Apr. 5, 2022 in PCTKR2022004818, 2 pages

* cited by examiner

METHOD OF CONTROLLING SPECIFIED FUNCTION AND ELECTRONIC DEVICE SUPPORTING SAME

CROSS-REFERENCE TO RELATED APPLICATIONS

This application is a continuation of International Application No. PCT/KR2022/004818 designating the United States, filed on Apr. 5, 2022, in the Korean Intellectual Property Office and claiming priority to Korean Patent Application No. 10-2021-0045491, filed on Apr. 7, 2021, in the Korean Intellectual Property Office, the disclosures of which are incorporated by reference herein in their entireties.

BACKGROUND

Field

The disclosure relates to a method for controlling a specified function, and an electronic device supporting the same.

Description of Related Art

An electronic device for providing an augmented reality technology may superimpose a virtual object onto an actually existing thing or environment and simultaneously provide the virtual object and the thing through a display.

Electronic devices may be formed in various types to provide augmented reality to users. For example, electronic devices for providing augmented reality may include a head-mounted device (HMD) type or non-head mounted device (non-HMD) type.

HMD-type electronic devices for providing augmented reality may include a glasses type. In the case of the glasses type, a temple may be designed in a fixed manner on a main unit including a display so as to contact the user's body. No separate case capable of storing the glasses exists because the temple is fixed. This is because if the glasses having a fixed temple is stored in a glasses case, the glasses may be fractured.

In order to address the problem of glass fracture, the glasses structure may be changed such that the temple can be folded, thereby making it possible to store the glasses in the glasses case. The glasses case can be used to simply store the glasses. In addition, mechanical characteristics of the glasses make it difficult to mount a large-capacity battery that occupies a predetermined area, and the glasses using time may be short.

SUMMARY

Embodiments of the disclosure provide a case capable of storing glasses connected to another electronic device (for example, smartphone) may include a function of an electronic device related to the glass (for example, charging function and glass information display) in addition to the usage of simple glasses storage.

Accordingly, a specified function of the glasses may be controlled, based on the state in which the glasses are mounted inside the case, the temple folding state, and the user's wearing state. In addition, the amount of power of the glasses battery may be identified, and the timepoint to execute the specified function may be controlled based on the identified amount of power.

According to an example embodiment disclosed herein, a first electronic device may include: a body including at least one sensor, a temple connected to the body, a hinge connecting the body and the temple and configured to allow the temple connected to the body to be folded in a specified direction within a specified angle, and a processor functionally connected to the at least one sensor, wherein the processor is configured to: determine whether the first electronic device is in a first state of being mounted in a second electronic device, identify whether the first electronic device is in a second state of being worn, through the at least one sensor, and execute a specified function of the first electronic device, based on at least one of the first state and/or the second state.

A method of operating a first electronic device including a body, a hinge, and a temple according to an example embodiment disclosed herein may include" determining whether the first electronic device is in a first state of being mounted in a second electronic device, determining whether the first electronic device is in a second state of being worn, through at least one sensor, and executing a specified function of the first electronic device, based on the first state and the second state.

According to various example embodiments disclosed herein, a method for controlling a specified function and an electronic device supporting the same may control the specified function of the electronic device, based on the state in which the electronic device is mounted in another electronic device (case), the temple folding state, and the user's wearing state, such that no separate input is required from the user, thereby providing convenience.

In addition, the amount of power in the battery of the electronic device may be identified, and a low-power mode may be entered based on the amount of power. In the low-power mode, a timepoint to execute a function of the electronic device may be controlled to be a timepoint at which power can be saved (for example, if the user mounts the electronic device, a specified function to be executed previously is executed simultaneously) such that, by improving the electronic device use time, the user can use the electronic device for a long time.

Various other advantageous effects identified explicitly or implicitly through the disclosure may be provided.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
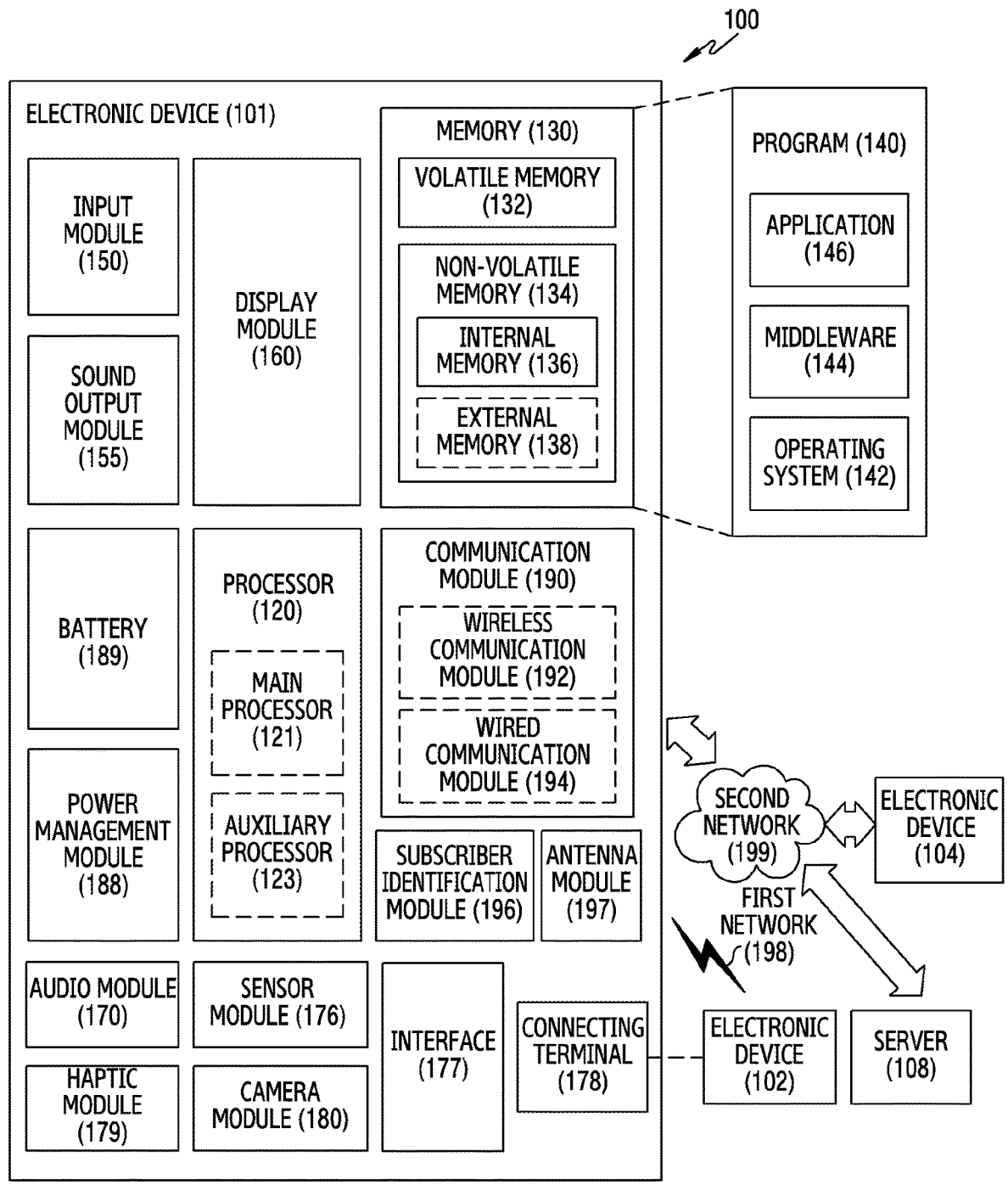
FIG. 1 is a block diagram illustrating an example electronic device in a network environment according to various embodiments.

In relation to the above-described description of the drawings, the same reference numerals may be assigned to the same or corresponding components.

Hereinafter, various example embodiments of the disclosure will be described with reference to the accompanying drawings. For convenience of description, the sizes of the components shown in the drawings may be exaggerated or reduced, and are not limited by what is shown.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
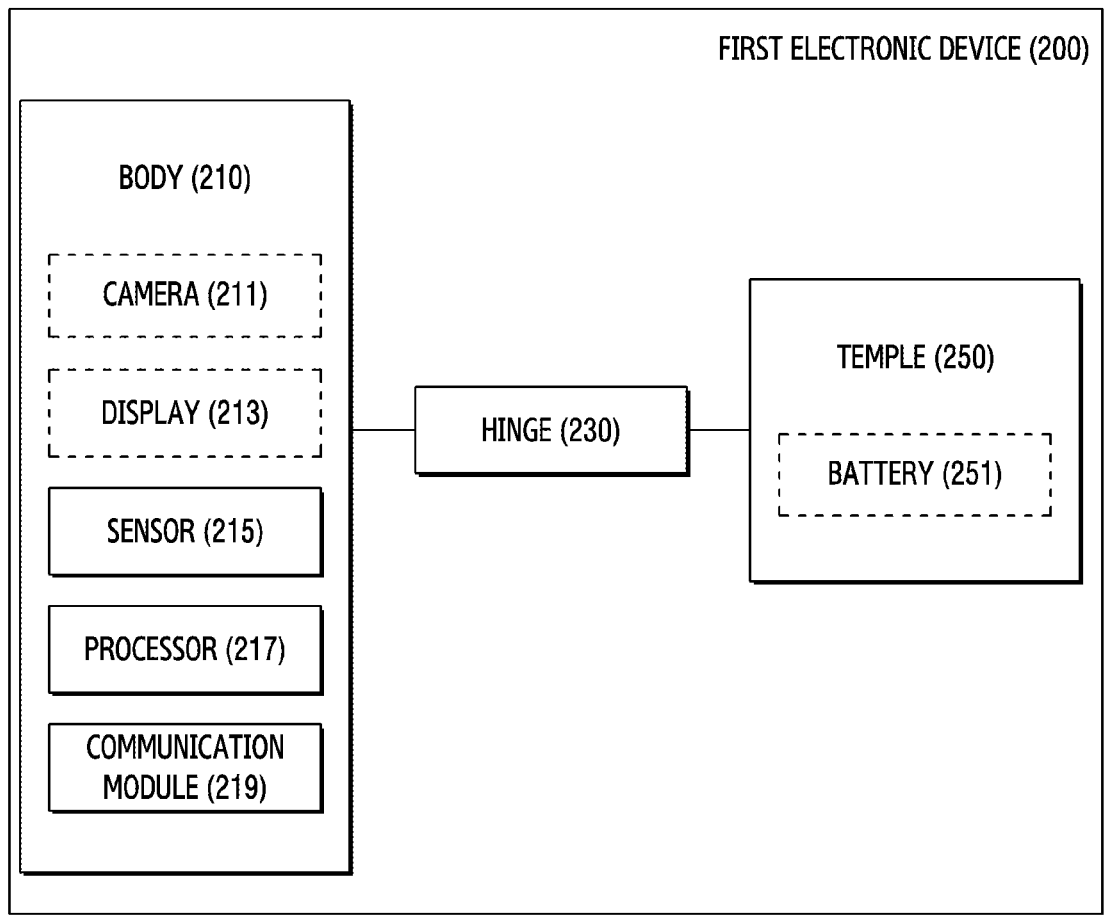
FIG. 2A is a block diagram illustrating an example configuration of a first electronic device according to various embodiments.

FIG. 2A is a block diagram illustrating an example configuration of a first electronic device 200 according to various embodiments.

Figure 10:
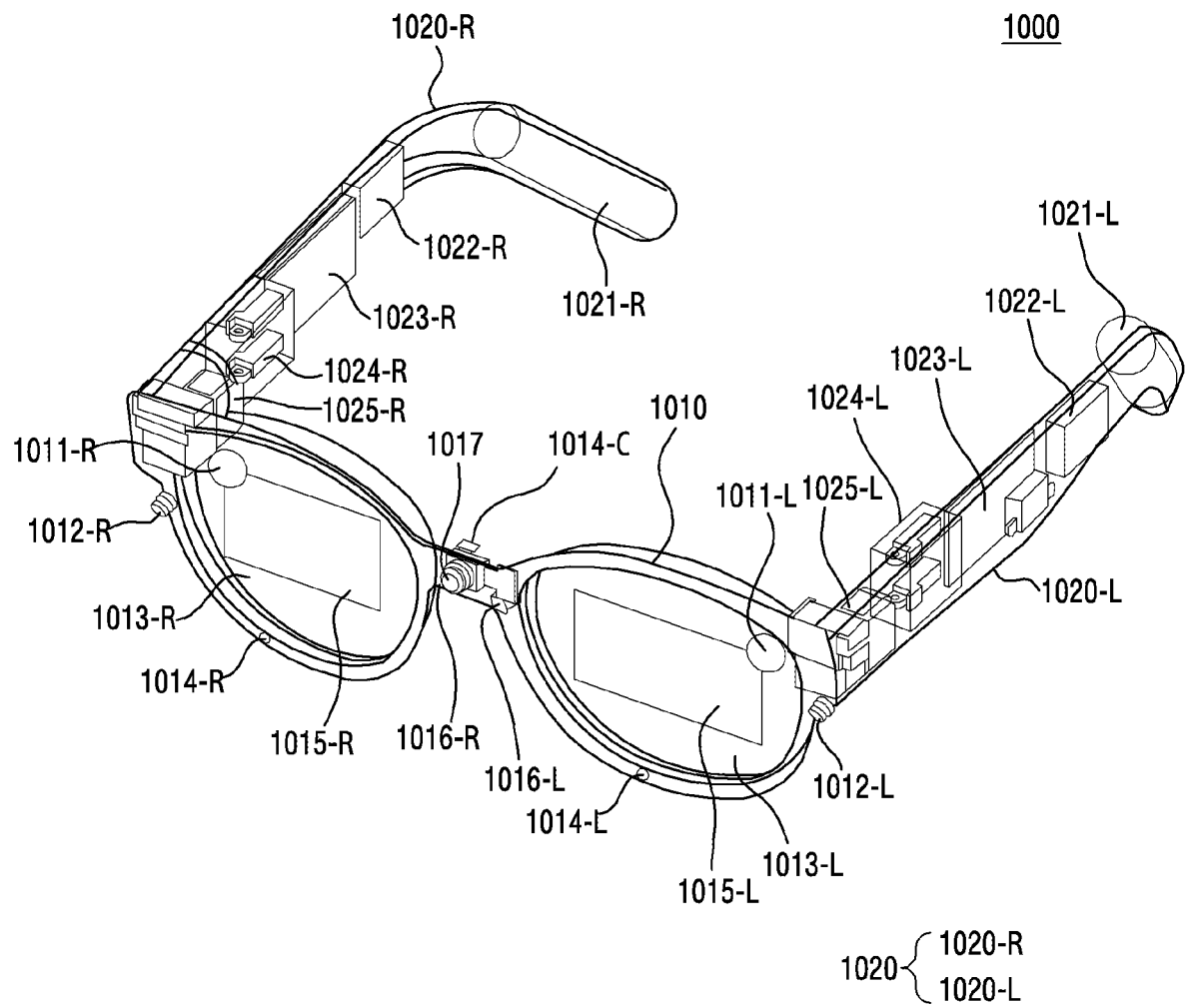
FIG. 10 is a diagram illustrating a wearable electronic device according to various embodiments.

In an embodiment, the first electronic device 200 may include a part or all of the components configuring a wearable electronic device 1000 of FIG. 10.

Referring to FIG. 2A, the first electronic device 200 may determine a first state of the first electronic device 200. The first state may include a state in which the first electronic device 200 is mounted in a second electronic device 301 (refer to FIG. 2B).

When the first electronic device 200 is not mounted in the second electronic device 301, the first electronic device 200 may be switched from a first mode (e.g., a sleep mode) to a second mode (e.g., a wake-up mode).

When the first electronic device 200 is switched to the wake-up mode, the first electronic device 200 may identify a second state of the first electronic device 200. The second state may include a state in which the first electronic device 200 is worn on a user's body. According to an embodiment, the first electronic device 200 may determine the second state of the first electronic device 200 through at least one sensor to be described later.

When the first electronic device 200 corresponds to the second state, the first electronic device 200 may receive data from a third electronic device (e.g., a third electronic device 302 of FIG. 3B) to output the data.

According to an embodiment, the first electronic device 200 may include a body 210, a hinge 230, and a temple 250. The first electronic device 200 may be in the form of glasses.

According to an embodiment, the body 210 may include a camera 211 (e.g., the camera module 180 of FIG. 1), a display 213 (e.g., the display module 160 of FIG. 1), a sensor 215 (e.g., the sensor module 176 of FIG. 1), a processor (e.g., including processing circuitry) 217 (e.g., the processor 120 of FIG. 1), and a communication module (e.g., including communication circuitry) 219. However, the configuration of the body 210 is not limited thereto.

According to various embodiments, the body 210 may not include at least one of the above-described components, and may include at least one other component. For example, the body 210 may include the communication module 219 (e.g., the communication module 190 of FIG. 1). The processor 217 may control the communication module to transmit or receive data to or from another electronic device (e.g., the electronic device 102 or 104 of FIG. 1) or a server (e.g., the server 108 of FIG. 1) through the communication module.

According to an embodiment, the hinge 230 may connect the body 210 and the temple 250. The hinge 230 may allow the temple 250 connected to the body 210 to be folded (e.g., a folded state) or unfolded (e.g., an unfolded state) in a specified direction within a predetermined angle. The temple 250 may include a temple structure connected to the body including an optical member (e.g., a display) among glass structures.

According to an embodiment, the processor 217 may identify a folded state or an unfolded state of the temple 250 through a folding detection sensor (not shown). A method for identifying the folding state will be described in detail below.

According to an embodiment, the processor 217 may identify the first state related to a state in which the first electronic device 200 is mounted in the second electronic device 301. The second electronic device 301 may be a case-type electronic device for storing and charging the first electronic device 200.

According to an embodiment, the processor 217 may determine whether the first electronic device 200 corresponds to the first state. The first state may include a state in which the first electronic device 200 is mounted in the second electronic device 301. In an embodiment, in a case of being connected to the second electronic device 301 through, for example, a pogo pin disposed on the first electronic device 200, the first electronic device 200 may determine that the first electronic device 200 is mounted in the second electronic device 301.

According to an embodiment, the processor 217 may identify that the first electronic device 200 is mounted in the second electronic device 301, based on the identified first state. When the first electronic device 200 is mounted in the second electronic device 301, the processor 217 may maintain the first mode (e.g., a sleep mode) of the first electronic device 200. In addition, the processor 217 may transmit at least one of temperature information and battery information of the first electronic device 200 to the second electronic device 301 through the communication module 219. That is, when the first electronic device 200 is mounted in the second electronic device 301, the first electronic device 200 may be in a state in which communication is connected with the second electronic device 301 via a wired/wireless network.

A detailed description for identifying the first state will be described below with reference to FIG. 5.

According to an embodiment, the processor 217 may identify that the first electronic device 200 is not mounted in the second electronic device 301, based on the identified first state. When the first electronic device 200 is not mounted in the second electronic device 301, the processor 217 may execute a first function. The first function may include a function in which the processor 217 switches from the first mode (e.g., a sleep mode) to the second mode (e.g., a wake-up mode).

For example, the first mode may be a power saving mode of causing the processor 217 to wait so as to reduce current consumption when the first electronic device 200 is not used by a user for a predetermined (e.g., specified) time. The second mode may be a mode of activating the processor 217 when an operation to use the first electronic device 200 by the user is detected.

According to an embodiment, in a case of executing the first function, the processor 217 may release a communication connection with the second electronic device 301 via a wired/wireless network. In addition, the processor 217 may release communication with the second electronic device 301 and establish communication with a third electronic device 302 via a wired/wireless network. That is, when the first electronic device 200 is not mounted in the second electronic device 301, the processor 217 may execute the first function of switching to the second mode (e.g., a wake-up mode) and releasing a communication connection with the second electronic device 301 to establish communication with the third electronic device 302.

According to an embodiment, after executing the first function, the processor 217 may identify a folding state of the temple 250 included in the first electronic device 200. The folding state may include a state in which the temple 250 is folded (a folded state) or unfolded (an unfolded state) in a specified direction.

According to an embodiment, the processor 217 may identify the folding state, based on data obtained through the folding detection sensor.

For example, when a value of data obtained from the folding detection sensor is included within a range pre-configured in the folding detection sensor, the processor 217 may identify that the temple 250 is in an unfolded state. For another example, when a value of data obtained from the folding detection sensor is not included within the range pre-configured in the folding detection sensor, the processor 217 may identify that the temple 250 is in a folded state.

In relation to the folding detection sensor, for example, the folding detection sensor may include, for example, and without limitation, a proximity sensor, a pressure sensor, and a grip sensor which can detect a folding state of the temple 250, and is not limited thereto as long as the same is a sensor capable of detecting a folding state of the temple 250. The folding detection sensor may be at least one sensor different from the sensor 215 (e.g., at least one sensor).

For example, the processor 217 may identify the folding state through the proximity sensor. When data obtained from the proximity sensor is out of a range pre-configured in the proximity sensor, the processor 217 may identify that the temple 250 is in contact with the body 210 (an unfolded state).

According to an embodiment, the processor 217 may identify a folding state of the temple 250 through a circuit (not shown) as well as the folding detection sensor. For example, the circuit may include an interrupt circuit and a power IC. In addition, the circuit may be disposed near a position where the body 210 and the temple 250 are connected to each other.

For another example, the processor 217 may identify the folding state through the interrupt circuit. When a level of a received voltage signal is changed from a "high" level to a "low" level, the processor 217 may identify that the temple 250 is in contact with the body 210 (unfolded) (e.g., a state in which a glasses frame is unfolded).

According to an embodiment, the processor 217 may identify that the temple 250 is folded (a folded state). When the temple 250 is in a folded state, the processor 217 may maintain the first function.

According to an embodiment, the processor 217 may identify that the temple 250 is unfolded (an unfolded state), based on the folding state.

When the temple 250 is unfolded, the processor 217 may execute a second function. The second function may be a function in which the processor 217 switches the display 213 to an on state and activates the sensor 215 (e.g., at least one sensor). The sensor 215 may be, as a sensor for identifying whether the first electronic device 200 is worn on a user's body, a sensor different from the folding detection sensor. The sensor 215 may include a proximity sensor, an ultrasonic sensor, a grip sensor, and a biometric sensor, and is not limited thereto as long as the same is a sensor capable of determining whether the device is worn on a user's body. A description related to the second function will be described in detail with reference to FIG. 6.

According to an embodiment, when the activation of the sensor 215 is completed, the processor 217 may identify whether the first electronic device 200 is in the second state related to a state of being worn on a user's body, through the sensor 215.

According to an embodiment, in a case of detecting that the first electronic device 200 is worn on a user's body, the processor 217 may execute a third function. For example, the third function may be a function of operating the camera 211 and outputting, on the display 213, a virtual object related to a thing or a place recognized by the first electronic device 200 through the camera 211. A description related to the third function will be described in detail with reference to FIG. 7.

According to an embodiment, the processor 217 may identify the amount of power of a battery 251 (e.g., the battery 189 of FIG. 1) included in the first electronic device 200. For example, the battery 251 may be included in the temple 250. When the amount of power of the battery 251 is less than or equal to a specified value, the processor 217 may switch the first electronic device 200 to a low power mode. The low power mode may be a mode for minimizing and/or reducing power consumption of the first electronic device 200.

According to an embodiment, the processor 217 may switch the first electronic device 200 to the low power mode, and change an execution time point of at least one function among the multiple functions (the first function, the second function, and the third function) to a time point at which power consumption can be minimized and/or reduced. For example, the processor 217 may identify the second state. The processor 217 may execute the first function (e.g., switching to a second mode (e.g., a wake-up mode)) executed when the first electronic device 200 is not mounted in the second electronic device 301, when the first electronic device 200 is worn on a user's body.

In an embodiment, an activation time point of the first function, the second function, and the third function may be changed according to a user's configuration. For example, an on function of the display 213 may be performed, according to the user's configuration, in at least one state among the second state in which the first electronic device 200 is worn on a user's body, an unfolded state of the temple 250 of the first electronic device 200, and a state in which the first electronic device 200 is not received in the second electronic device 301. The user configuration may include a configuration previously specified by a user in the processor 217 of the first electronic device 200. For another example, the processor 217 may identify the folding state. The processor 217 may execute the first function when the temple 250 is in an unfolded state. That is, in the low power mode, the processor 217 may change an execution time point of the functions to a later time point, and thus reduce current consumption of the first electronic device 200.

Figure 2B:
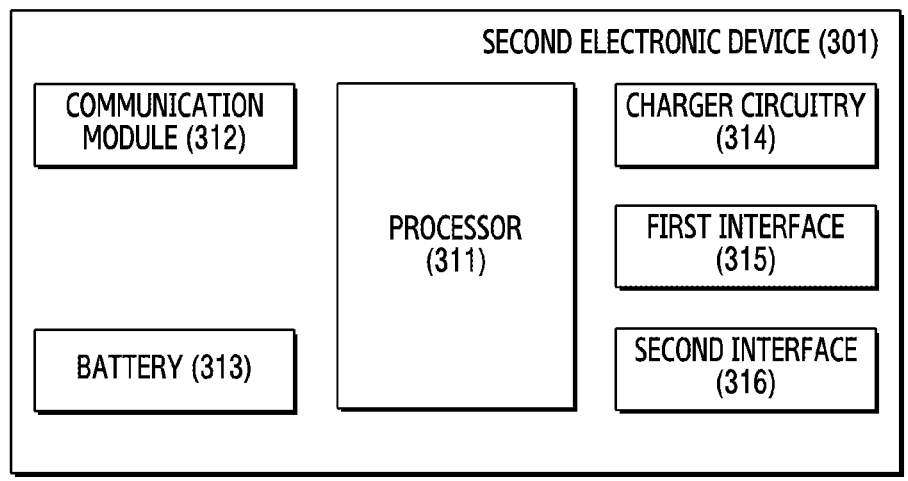
FIG. 2B is a block diagram illustrating an example configuration of a second electronic device according to various embodiments.

FIG. 2B is a block diagram illustrating an example configuration of the second electronic device 301 according to various embodiments.

In an embodiment, a part or all of the description of the first electronic device 200 described with reference to FIG. 1 may also be applied to the second electronic device 301.

Figure 11:
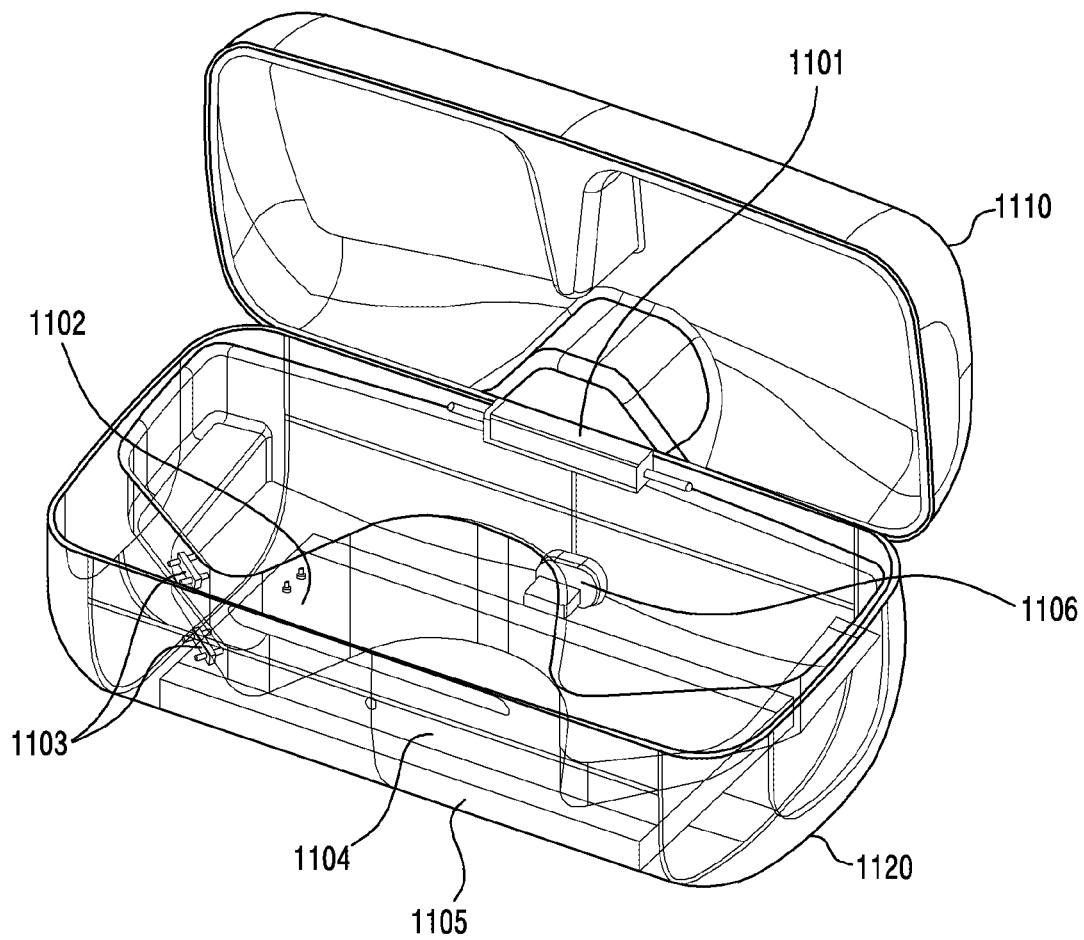
FIG. 11 is a diagram illustrating an example case device according to various embodiments.

In an embodiment, the second electronic device 301 of FIG. 2B may include a part or all of the components configuring a case device 1100 of FIG. 11.

Referring to FIG. 2B, the second electronic device 301 may include a processor (e.g., including processing circuitry) 311, a communication module (e.g., including communication circuitry) 312, a battery 313, charger circuitry 314, and a first interface 315.

According to an embodiment, the processor 311 may include various processing circuitry and execute one or more instructions stored in a memory (not shown). In an embodiment, the second electronic device 301 may include a plurality of processors. The processor 311 may include at least one of a circuit for processing data, for example, and without limitation, an integrated circuit (IC), an arithmetic logic unit (ALU), a field programmable gate array (FPGA), and a large scale integration (LSI).

According to an embodiment, the communication module 312 (e.g., the communication module 190 of FIG. 1) may include various communication circuitry and support communication between the first electronic devices 200. For example, the communication module 312 may establish wireless communication with the first electronic device 200 according to a prescribed communication protocol, and transmit or receive a signal or data using a frequency band supporting the wireless communication.

The wireless communication may include, for example, at least one of ultra-wideband (UWB), communication, Wi-Fi communication, Bluetooth (BT) communication, and low energy Bluetooth (BLE) communication.

According to an embodiment, the battery 313 may represent, for example, and without limitation, a battery cell, a battery module, or a battery pack. The battery 313 may include a secondary battery or a condenser which stores power by charging. The battery 313 may be one of a lithium ion battery (Li-ion), a lithium ion polymer battery (Li-ion polymer), a lead storage battery, a nickel-cadmium battery (NiCd), and a nickel hydrogen storage battery (NiMH). When the magnitude of the current supplied to the battery 313 is greater than the magnitude of the current output from the battery 313, the battery 313 may be charged. When the magnitude of the current output from the battery 313 is greater than the magnitude of the current supplied to the battery 313, the battery 313 may be discharged.

According to an embodiment, the charger circuitry 314 may correspond to a charger IC and/or a charging module for controlling charging. The charger circuitry 314 may be disposed between the battery 313 and at least one hardware component electrically connected thereto so as to control the flow of power output from the battery 313 and/or power supplied toward the battery 313.

According to an embodiment, the second electronic device 301 may receive power from an external power source using the first interface 315 (e.g., a wired interface and/or a wireless interface). The charger circuitry 314 may receive power from an external power source using the first interface 315. The charger circuitry 314 may charge the battery 313 and/or the first electronic device 200 connected through a second interface 316 using power supplied from an external power source.

According to an embodiment, the second interface 316 may be an interface which is connected to the first electronic device 200 to supply power to the first electronic device 200, and transmit or receive data to or from the first electronic device 200. In an embodiment, a control command may be received from the first electronic device 200 through the second interface 316. In an embodiment, the second interface 316 may be a connection terminal for connecting to the first electronic device 200.

Figure 3A:
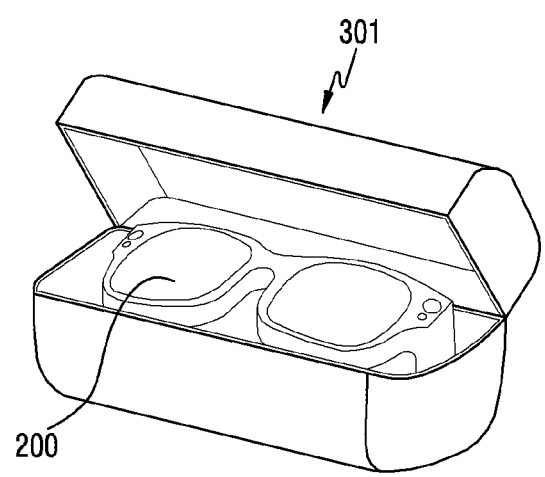
FIG. 3A is a diagram illustrating an example method for providing a function according to a connection state between electronic devices, according to various embodiments.
Figure 3B:
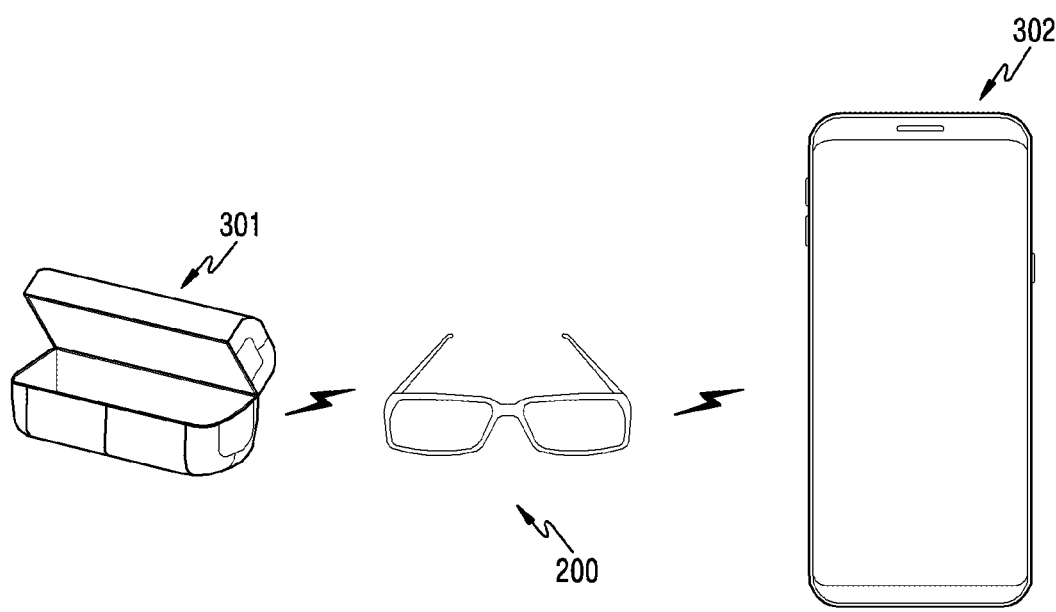
FIG. 3B is a diagram illustrating an example method for providing a function according to a connection state between electronic devices, according to various embodiments.

FIGS. 3A and 3B are diagrams illustrating an example method for providing a function according to a connection state between electronic devices, according to various embodiments.

Referring to FIG. 3A, the first electronic device 200 (e.g., the electronic device 101 of FIG. 1) may be in a state of being mounted in the second electronic device 301. When the first electronic device 200 is mounted in the second electronic device 301, a temple (e.g., the temple 250 of FIG. 2A) may be in a folded state. In an embodiment, when the first electronic device 200 corresponds to a first state of being mounted in the second electronic device 301, the first electronic device 200 may be physically and/or electrically connected to the second electronic device 301.

According to an embodiment, the first electronic device 200 may identify the first state related to whether the first electronic device is mounted in the second electronic device 301. When it is identified that the first electronic device is mounted in the second electronic device 301, based on the identified first state, the first electronic device 200 may transmit at least one of temperature information and battery information to the second electronic device 301 through the communication module 219.

For example, when the first electronic device 200 is mounted in the second electronic device 301, the first electronic device 200 may be in a state of being communicatively connected to the second electronic device 301.

A detailed description for identifying the first state will be described below with reference to FIG. 5.

Referring to FIG. 3B, the first electronic device 200 (e.g., the electronic device 101 of FIG. 1) may be in a state of not being mounted in the second electronic device 301. The first electronic device 200 may determine whether the first electronic device 200 is in the first state of being mounted in the second electronic device 301. When the first electronic device 200 is not mounted in the second electronic device 301, based on the identified first state, the first electronic device 200 may execute a first function. When the processor 217 executes the first function, the first electronic device 200 may be switched from a first mode (e.g., a sleep mode) to a second mode (e.g., a wake-up mode). In addition, when the first function is executed, the first electronic device 200 may release a communication connection with the second electronic device 301 connected through the communication module 219, and establish communication with the third electronic device 302.

According to an embodiment, after executing the first function, the first electronic device 200 may identify a folding state of the temple 250. The first electronic device 200 may identify the folding state to identify that the temple 250 is in an unfolded state. When the temple 250 is in an unfolded state, the first electronic device 200 may switch a display (e.g., the display module 160 of FIG. 1 or the display 213 of FIG. 2A) to an on state or activate a sensor (e.g., the sensor 215 of FIG. 2A). When it is detected that the first electronic device 200 is worn on a user's body through the sensor 215, the first electronic device 200 may receive image data to be output on the display 213 from the third electronic device 302.

Figure 4:
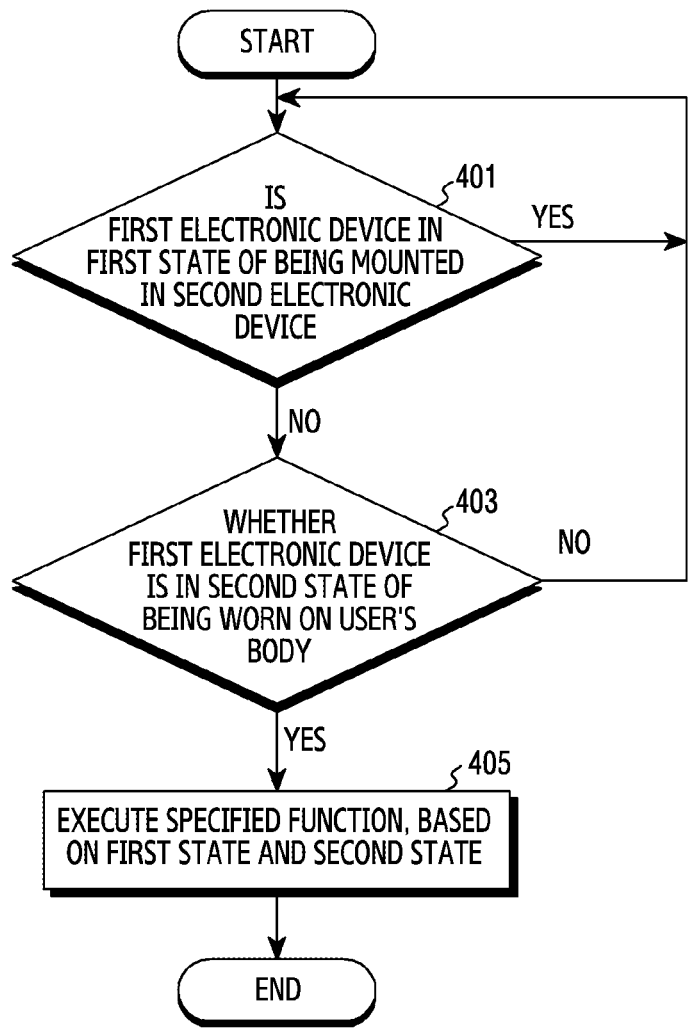
FIG. 4 is a flowchart illustrating an example method for controlling a specified function of a first electronic device, according to various embodiments.

FIG. 4 is a flowchart illustrating an example method for controlling a specified function of the first electronic device 200, according to various embodiments.

In operation 401 of FIG. 4, a processor (e.g., the processor 120 of FIG. 1 or the processor 217 of FIG. 2A) of a first electronic device (e.g., the electronic device 101 of FIG. 1 or the first electronic device 200 of FIG. 2A) may determine whether the first electronic device 200 is in a first state of being mounted in the second electronic device 301. The first electronic device 200 may be connected within the second electronic device 301 to the second interface 316 disposed on the second electronic device 301 in a wired manner, and recognize that the first electronic device is mounted in the second electronic device 301.

According to an embodiment, the processor 217 may identify that the first electronic device 200 is mounted in the second electronic device 301, based on the first state.

When the first electronic device 200 is mounted in the second electronic device 301, the processor 217 may transmit at least one of temperature information and battery information of the first electronic device 200 to the second electronic device 301. The temperature information may be information related to the current temperature of the first electronic device 200, and the battery information may be information related to the amount of power stored in the battery 251 of the first electronic device 200. When the first electronic device 200 is mounted in the second electronic device 301, the processor 217 may maintain a first mode. In an example, the first mode may be a power saving mode of causing the processor 217 to wait so as to reduce current consumption of the first electronic device 200.

According to an embodiment, the processor 217 may identify that the first electronic device 200 is not mounted in the second electronic device 301, based on the first state. When the first electronic device 200 is not mounted in the second electronic device 301, the processor 217 may execute a first function. A detailed description related to the first function will be disclosed in FIG. 5.

According to an embodiment, the processor 217 may execute the first function and start operation 403.

In operation 403, the processor 217 may determine whether the first electronic device 200 is in a second state of being worn on a user's body.

According to an embodiment, the processor 217 may identify whether the first electronic device 200 is worn on the user's body through a sensor (e.g., the sensor module 176 of FIG. 1 or the sensor 215 of FIG. 2A). For example, when the sensor 215 is a biometric sensor, the processor 217 may identify whether the first electronic device 200 is currently mounted or not mounted on the user's body, based on data obtained through the biometric sensor.

In operation 405, the processor 217 may execute a specified function, based on the first state and the second state. The specified function may be a third function (e.g., the third function of FIG. 2A). The third function may be a function of performing an operation of the camera 211 included in the first electronic device 200 and outputting, to the display 213, a virtual object related to a thing or a place recognized by the first electronic device 200.

According to an embodiment, the processor 217 may activate a vision algorithm by operating the camera 211 included in the first electronic device 200, based on the first state and the second state. The processor 217 may display virtual information related to a specific object on the display 213 through the camera 211. That is, the processor 217 may provide a specific object and virtual information to a user. When the first electronic device 200 is not mounted in the second electronic device 301 and the first electronic device 200 is worn on the user's body, the processor 217 may execute the specified function.

Figure 5:
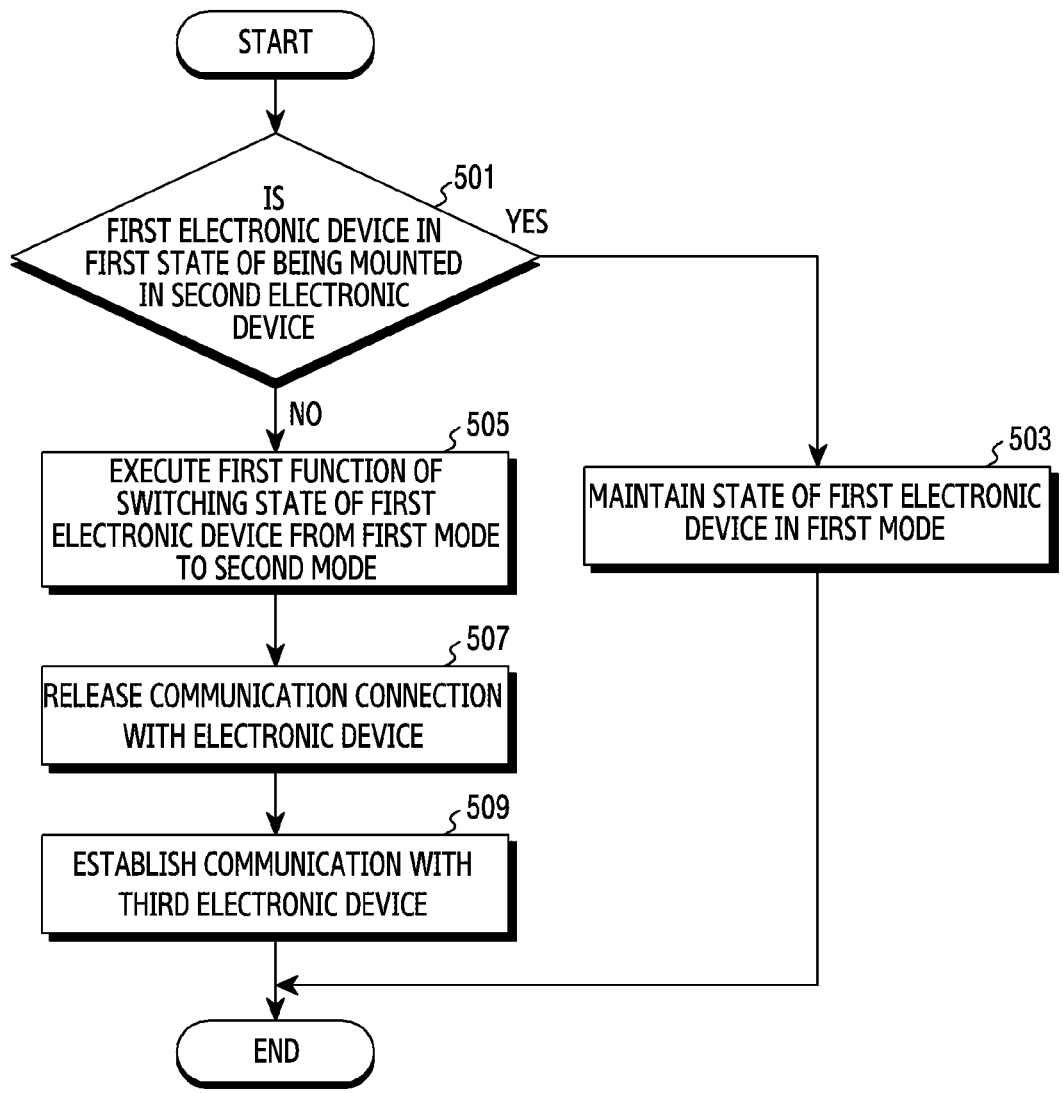
FIG. 5 is a flowchart illustrating an example method for providing a first function, according to various embodiments.

FIG. 5 is a flowchart illustrating an example method for providing a first function, according to various embodiments.

According to an embodiment, a first function may be a function executed by the processor 217 of the first electronic device 200 when the first electronic device 200 is physically and/or electrically disconnected from the second interface 316 of the second electronic device 301. In an example, the first function may include a function in which the processor 217 switches from a first mode (e.g., a sleep mode) to a second mode (e.g., a wake-up mode). In an example, the first function may be a function executed by the processor 217 in response to the processor 217 determining that the first electronic device 200 is not mounted in the second electronic device 301 and thus does not correspond to a first state.

In operation 501 of FIG. 5, a processor (e.g., the processor 120 of FIG. 1 or the processor 217 of FIG. 2A) of a first electronic device (e.g., the electronic device 101 of FIG. 1 or the first electronic device 200 of FIG. 2A) may determine whether the first electronic device 200 is in the first state of being mounted in the second electronic device 301.

In an embodiment, in a case of determining that the first electronic device 200 is mounted in the second electronic device 301, the processor 217 may determine that the first electronic device 200 corresponds to the first state.

In an embodiment, when the first electronic device 200 is connected to the second electronic device 301 through the second interface 316 of the second electronic device 301, the processor 217 may determine that the first electronic device 200 is mounted in the second electronic device 301. In an example, when a wired connection of the first electronic device 200 with the second interface 316 of the second electronic device 301 is released, the processor 217 may determine that the first electronic device 200 is not mounted in the second electronic device 301.

According to an embodiment, when it is identified that the first electronic device 200 is mounted in the second electronic device 301, the processor 217 may perform operation 503.

In an embodiment, in operation 503, the processor 217 may maintain a state of the first electronic device 200 in the first mode (e.g., a sleep mode). In an example, the processor 217 may maintain a first mode (e.g., a sleep mode) state when the first electronic device 200 is connected to the second electronic device 301 through the second interface 316 of the second electronic device 301. The first mode may be a mode for causing the processor 217 of the first electronic device 200 to wait. In an example, the first mode may be a state in which data is not transmitted from the third electronic device 302.

In an example, the processor 217 may transmit at least one of the temperature information and the battery information to the second electronic device 301 while maintaining the first mode. The temperature information may be information related to the current temperature of the first electronic device 200, and the battery information may be information related to the amount of power stored in the battery 251 of the first electronic device 200.

According to an embodiment, when the first electronic device 200 is mounted in the second electronic device 301, the processor 217 may receive power from the second electronic device 301 to charge a battery (e.g., the battery 189 of FIG. 1 or the battery 251 of FIG. 2A) of the first electronic device 200. For example, when the first electronic device 200 is mounted in the second electronic device 301, while the first mode (e.g., a sleep mode) is maintained, the battery 251 may be charged and a communication connection with another electronic device may be maintained.

According to an embodiment, the processor 217 may identify that the first electronic device 200 is in a state of not being mounted in the second electronic device 301, based on the first state. In an example, when the first electronic device 200 is physically and/or electrically disconnected from the second interface 316 of the second electronic device 301, the processor 217 may determine that the first electronic device 200 is not mounted in the second electronic device 301. When it is identified that the first electronic device 200 is not mounted in the second electronic device 301, the processor 217 may perform operation 505.

In operation 505, the processor 217 may perform the first function of switching a state of the first electronic device 200 from the first mode (e.g., a sleep mode) to the second mode (e.g., a wake-up mode).

According to an embodiment, when the first electronic device 200 is not mounted in the second electronic device 301, the processor 217 may execute the first function. The first function may include a function of switching from the first mode (e.g., a sleep mode) to the second mode (e.g., a wake-up mode). For example, the first mode may be a power saving mode of causing the processor 217 to wait so as to reduce current consumption when the first electronic device 200 is not used by a user for a predetermined time. The second mode may be a mode of activating the processor 217 when an operation to use the first electronic device 200 by the user is detected. That is, since the processor 217 has a high probability of using the first electronic device 200 by the user when the first electronic device 200 is not mounted in the second electronic device 301, the first electronic device 200 may be switched from the first mode to the second mode.

According to an embodiment, the first electronic device 200 may be mounted in the second electronic device 301 in a state in which power is turned off. When the first electronic device 200 has been mounted in the second electronic device 301 in the state in which power is off, and then a wired connection or a wireless connection is released, the power may be automatically switched to an on state. When the power of the first electronic device 200 is switched to the on state, the processor 217 may switch the first electronic device 200 to the second mode.

According to an embodiment, when the first electronic device 200 is switched to the second mode, the processor 217 may perform operation 507.

In operation 507, the processor 217 may release a communication connection with the second electronic device 301.

According to an embodiment, when the first electronic device 200 is not mounted in the second electronic device 301, the processor 217 may release the existing communication which has been connected with the second electronic device 301 in order to establish a communication connection with the third electronic device 302. That is, the processor 217 may release the communication connection with the second electronic device 301 to establish communication with the third electronic device 302 (e.g., a smart phone) of the user who is expected to use the first electronic device 200.

In operation 509, the processor 217 may establish communication with the third electronic device 302.

According to an embodiment, when the communication connection with the second electronic device 301 is released, the processor 217 may establish communication with the third electronic device 302. The processor 217 may be connected with the third electronic device 302 through the communication module 219 in order to receive data for providing augmented reality to the user from the third electronic device 302.

According to an embodiment, when communication with the third electronic device 302 is established, the processor 217 may output, on the display 213 of the first electronic device 200, information (e.g., battery level information) on the first electronic device 200 and/or information (e.g., information on a device name of the third electronic device 302 or a battery level of the third electronic device 302) on the third electronic device 302.

In an embodiment, operation 507 may be omitted. For example, the processor 217 may not release communication with the second electronic device 301 and establish communication with the third electronic device 302. That is, the first electronic device 200 may establish communication with the second electronic device 301 and the third electronic device 302 in parallel.

Figure 6:
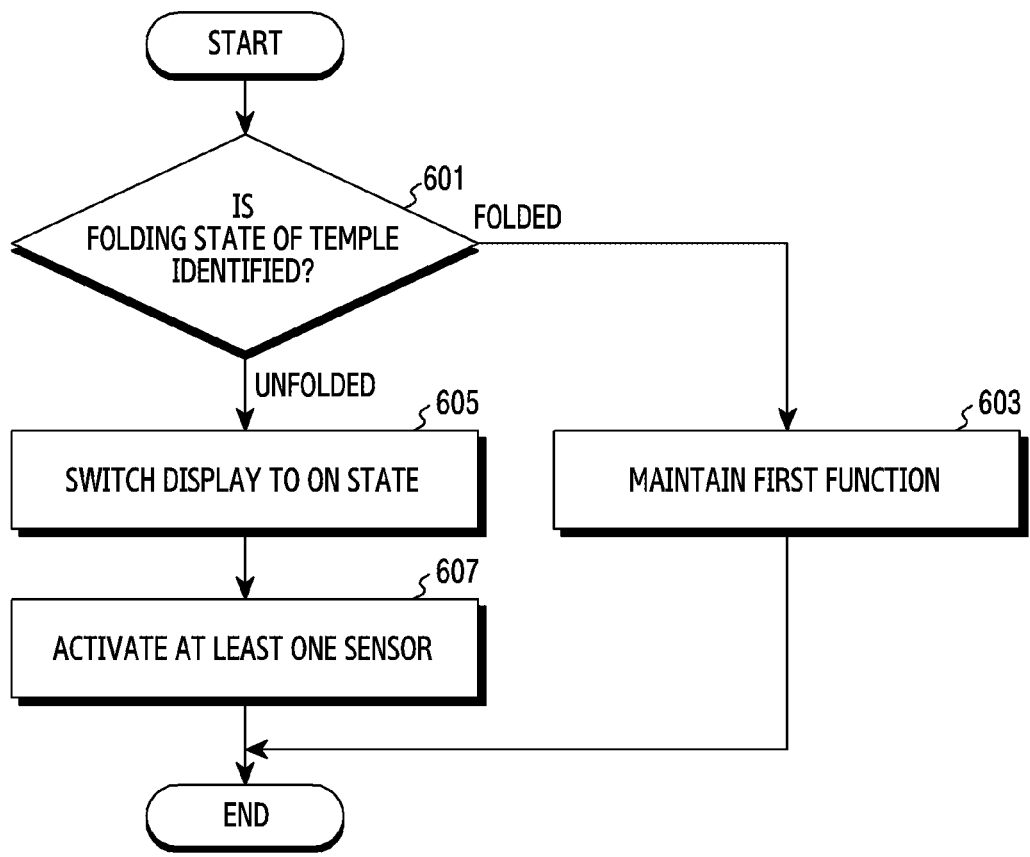
FIG. 6 is a flowchart illustrating an example method for providing a second function, according to various embodiments.

FIG. 6 is a flowchart illustrating an example method for providing a second function, according to various embodiments.

According to an embodiment, a second function may be a function of the first electronic device 200 being executed by the processor 217 of the first electronic device 200 when the temple 250 of the first electronic device 200 is in an unfolded state. In an example, the second function may be a function performed by the processor 217 by identifying a folding state of the temple 250 included in the first electronic device 200 by the processor 217.

In operation 601 of FIG. 6, a processor (e.g., the processor 120 of FIG. 1 or the processor 217 of FIG. 2A) of a first electronic device (e.g., the electronic device 101 of FIG. 1 or the first electronic device 200 of FIG. 2A) may identify a folding state of a temple (e.g., the temple 250 of FIG. 2A). The folding state may include a state in which the temple 250 is folded (a folded state) in a specified direction or unfolded (an unfolded state) in a specified direction.

According to an embodiment, the processor 217 may identify the folding state of the temple 250 through at least one of a folding detection sensor (not shown) and a circuit (not shown) included in a body (e.g., the body 210 of FIG. 2A). In addition, the processor 217 may identify the folding state of the temple 250, based on whether a folding angle of the temple 250 is included in a recognition area or a non-recognition area.

For example, the folding detection sensor may include at least one of a proximity sensor, a grip sensor, an ultrasonic sensor, and a pressure sensor, and is not limited thereto as long as the same is a sensor capable of identifying a folding state of the temple 250. In addition, the sensor may include an interrupt circuit and a power IC circuit, but is not limited thereto when the sensor includes a circuit which can identify a folding state of the temple 250.

For example, the body 210 may include a power IC for outputting power at a predetermined time interval, and the temple 250 may include a ground GND. When the temple 250 is unfolded in a specified direction and is in contact with the body 210 (a state in which a glasses frame is unfolded), the processor 217 may identify that power of the power IC is short-circuited to the ground included in the temple 250 and the temple 250 is in an unfolded state through a short-circuiting detection function. When the processor 217 recognizes the release of the short-circuiting through the short-circuiting detection function, the processor 217 may identify that the temple 250 is in a folded state.

For another example, the body 210 may include a power IC including power at a predetermined time interval, and a circuit for connecting the output of the power to the temple 250. When the temple 250 is unfolded in a specified direction, the processor 217 may recognize power through the power IC as the power normally forms a loop. The processor 217 may recognize the power and identify that the temple 250 is in an unfolded state. In addition, when the power does not form a loop, the processor 217 may not recognize the power through the power IC and may identify that the temple 250 is in a folded state.

For still another example, the folding detection sensor may be a grip sensor. The processor 217 may identify the folding state through the grip sensor. In order for the grip sensor to detect the folding state, a dielectric counterpart having a capacitance component may be included in the temple 250. When the temple 250 is in contact with the body 210, the processor 217 may recognize the capacitance component through the grip sensor so as to identify that the temple 250 is in a folded state. In addition, when the temple 250 is not in contact with the body 210, the processor 217 may not recognize the capacitance component, and thus may identify that the temple 250 is in an unfolded state.

The folding detection sensor may be an ultrasonic sensor. The processor 217 may identify a distance between the body 210 and the temple 250, based on a signal received through the ultrasonic sensor. For example, when the body 210 and the temple 250 come close to each other by a preconfigured distance or less, the temple 250 may be identified to be in an unfolded state. When the distance between the body 210 and the temple 250 is greater than or equal to a preconfigured distance, the temple 250 may be identified to be in a folded state. In addition, the folding detection sensor may be a pressure sensor. The processor 217 may identify whether the temple 250 is in contact with the body 210, based on a signal received through the pressure sensor. For example, in a case of receiving a signal included within a recognition range of the pressure sensor, the processor 217 may identify that the temple 250 is in an unfolded state in which the temple is in contact with the body 210. In a case of not receiving a separate signal through the pressure sensor, the processor 217 may identify that the temple 250 is in a folded state in which the temple is not in contact with the body 210.

According to an embodiment, in a case of detecting that the temple 250 is in a folded state, the processor 217 may perform operation 603.

In operation 603, the processor 217 may maintain a first function when it is identified that the temple 250 is in a folded state. The first function may include a function performed by the processor 217 when the first electronic device 200 does not correspond to a first state. In an example, the first state may be a state in which the first electronic device 200 is connected with the second interface 316 of the second electronic device 301 and is received in the second electronic device 301.

According to an embodiment, when it is identified that the temple is in an unfolded state, the processor 217 may perform operation 605.

In operation 605, when it is identified that the temple 250 is in an unfolded state, the processor 217 may switch a display (e.g., the display module 160 of FIG. 1 or the display 213 of FIG. 2A) to an on state. In an example, when it is identified that the temple 250 is in an unfolded state, the processor 217 may switch the display 213 to the on state while maintaining the first function.

According to an embodiment, when the temple 250 is unfolded, the processor 217 may switch the display 213 to the on state in order to display data received from the third electronic device 302 through the display 213. The processor 217 may perform operation 607 while switching the display 213 to the on state.

In operation 607, the processor 217 may activate at least one sensor 215.

According to an embodiment, the at least one sensor 215 may be a sensor for identifying whether the first electronic device 200 is worn on a user's body. The processor 217 may activate the at least one sensor 215 in order to identify whether the first electronic device 200 is worn on the user's body. That is, the at least one sensor 215 may be disposed in an area where the first electronic device 200 may be worn in contact with the user's body. In addition, the at least one sensor 215 may include a proximity sensor, a grip sensor, an ultrasonic sensor, and a pressure sensor different from the folding detection sensor.

According to an embodiment, the processor 217 may activate a microphone (not shown) (e.g., the input module 150 of FIG. 1) and a communication module (not shown) (e.g., the communication module 190 of FIG. 1) included in the first electronic device 200. That is, when the temple 250 is in an unfolded state, the processor 217 may execute a second function of switching the display 213 to an on state and activating configurations which may identify whether the first electronic device 200 is worn on a user's body.

Figure 7:
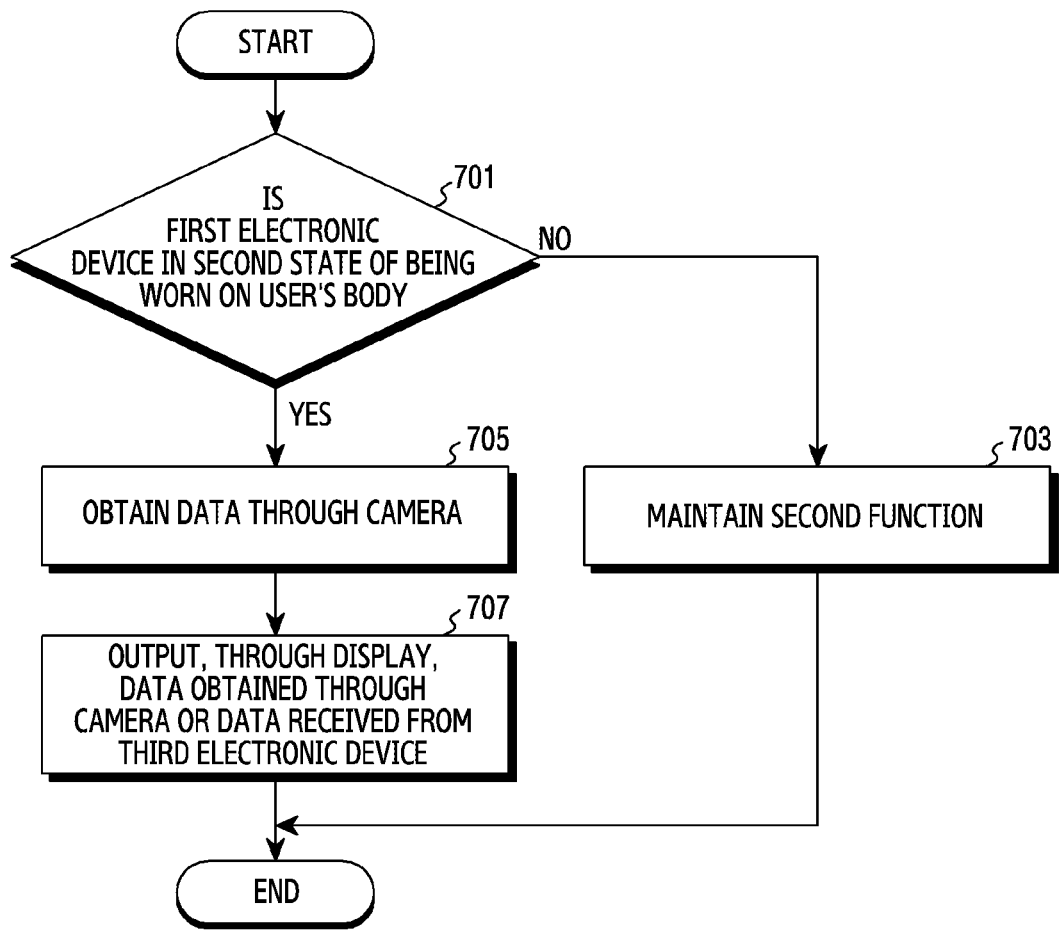
FIG. 7 is a flowchart illustrating an example method for providing a third function, according to various embodiments.

FIG. 7 is a flowchart illustrating an example method for providing a third function, according to various embodiments.

In an embodiment, a third function may be a function executed by the processor 217 of the first electronic device 200 when the first electronic device 200 is worn on a user's body. In an example, the third function may be a function executed by the processor 217 by identifying whether the first electronic device 200 corresponds to a second state by the processor 217.

In operation 701 of FIG. 7 according to an embodiment, a processor (e.g., the processor 120 of FIG. 1 or the processor 217 of FIG. 2A) of a first electronic device (e.g., the electronic device 101 of FIG. 1 or the first electronic device 200 of FIG. 2A) may identify the second state corresponding to a state of being worn on a user's body.

In an embodiment, the processor 217 may perform operation 701 through at least one sensor (e.g., the sensor module 176 of FIG. 1 or the sensor 215 of FIG. 2A) activated in operation 607.

According to an embodiment, the at least one sensor 215 may be disposed in an area where the first electronic device 200 is worn in contact with the user's body. For example, in a case of receiving a value corresponding to a range value (e.g., a voltage level) configured in the at least one sensor 215, the processor 217 may identify that the first electronic device 200 is worn on the user's body. On the other hand, for example, in a case of receiving a value larger or smaller than the range value configured in the at least one sensor, the processor 217 may identify that the first electronic device 200 is not worn on the user's body.

According to an embodiment, when the first electronic device 200 is not worn on the user's body, the processor 217 may execute operation 703.

In operation 703 according to an embodiment, the processor 217 may maintain a second function. The second function may include a function of switching a display (e.g., the display module 160 of FIG. 1 or the display 213 of FIG. 2A) to an on state and activating the at least one sensor 215 when a temple (e.g., the temple 250 of FIG. 2A) included in the first electronic device 200 is in an unfolded state.

In an embodiment, when the first electronic device 200 is not worn on the user's body, that is, is not in the second state, the processor 217 may output an inverted image through the display 213. In an example, the inverted image output through the display 213 may refer to an image output in a direction opposite to a direction facing the user's body (e.g., eyes) when the first electronic device 200 is worn on the user's body.

According to an embodiment, when the first electronic device 200 is worn on the user's body, the processor 217 may execute operation 705.

In operation 705 according to an embodiment, the processor 217 may obtain data using the camera 211. In an example, the processor 217 may recognize or track an external object through the camera 211. For example, the processor 217 may obtain information on eye tracking of the user wearing the first electronic device 200 using the camera 211.

According to an embodiment, the processor 217 may obtain information on the surrounding environment of the user wearing the first electronic device 200 using the camera 211.

In an embodiment, the processor 217 may transmit, to the third electronic device 302, information (e.g., the information on eye tracking of the user wearing the first electronic device 200 and/or the information on the surrounding environment of the user wearing the first electronic device 200) obtained through the camera 211. In an example, the third electronic device 302 may process data, based on information received from the first electronic device 200 (or the processor 217). In an example, the third electronic device 302 may obtain a virtual image and/or video, based on data received from the first electronic device 200.

In operation 707 according to an embodiment, the processor 217 may output, through the display 213, data obtained through the camera 211 or data received from the third electronic device 302.

In an example, the processor 217 may output data obtained through the camera 211, through the display 213. The processor 217 may output data (e.g., data on eye tracking of the user and/or data on surrounding environment information of the user wearing the first electronic device 200) obtained through the camera 211.

In an example, the processor 217 may transmit the obtained information to the second electronic device 301. In an example, the second electronic device 301 may process data, based on the information received from the first electronic device 200. The second electronic device 301 may transmit the processed data to the first electronic device 200. The first electronic device 200 may output the data received from the second electronic device 301 through the display 213.

Figure 8:
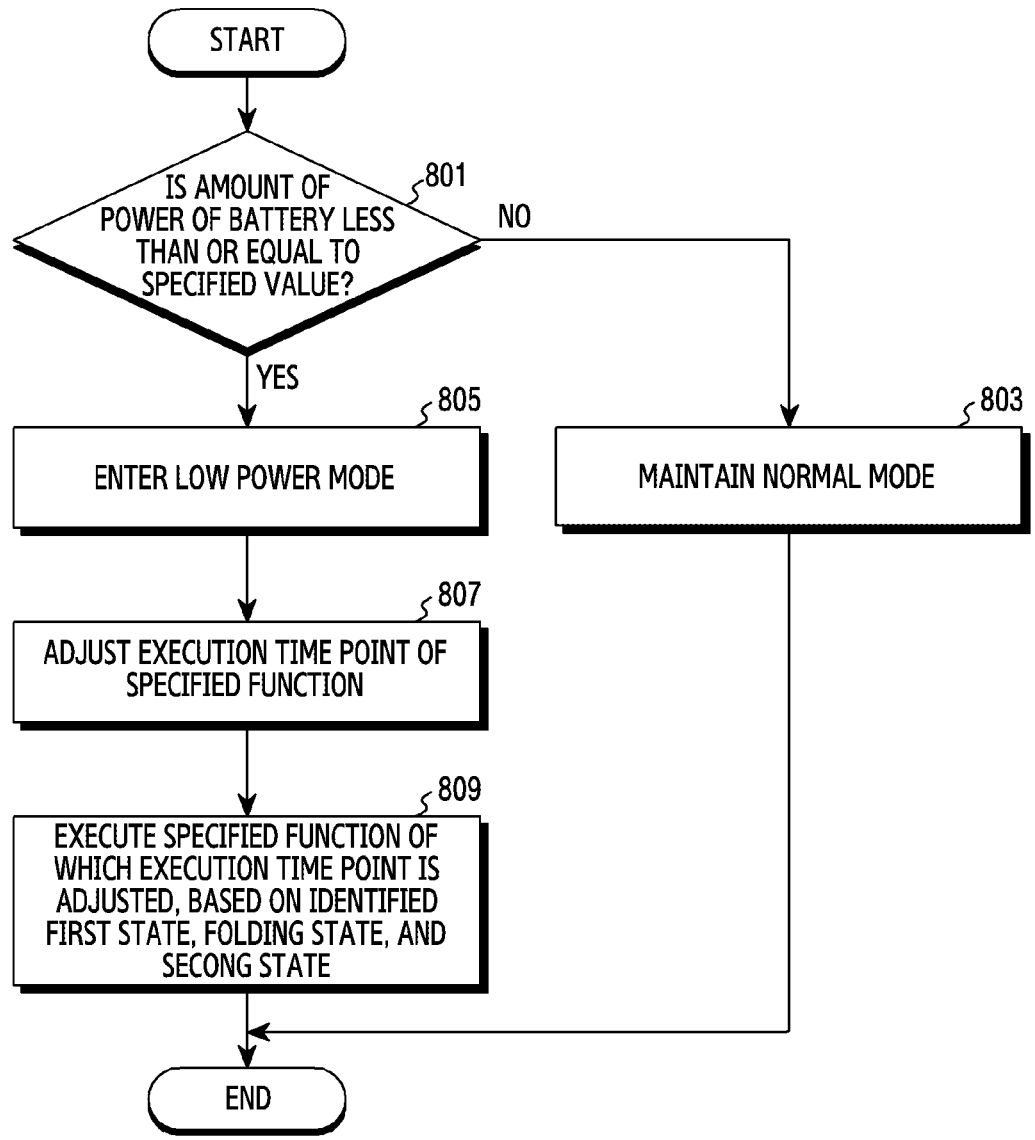
FIG. 8 is a flowchart illustrating an example method for providing a specified function in a low power mode, according to various embodiments.

FIG. 8 is a flowchart illustrating an example method for providing a specified function in a low power mode, according to various embodiments.

In operation 801 of FIG. 8, a processor (e.g., the processor 120 of FIG. 1 or the processor 217 of FIG. 2A) of a first electronic device (e.g., the electronic device 101 of FIG. 1 or the first electronic device 200 of FIG. 2A) may identify whether the amount of power of a battery (e.g., the battery 189 of FIG. 1 or the battery 251 of FIG. 2A) is less than or equal to a specified value.

According to an embodiment, when the amount of power stored in the battery 251 is greater than the specified value, the processor 217 may start operation 803.

In operation 803 according to an embodiment, when the amount of power of the battery 251 is greater than or equal to the specified value, the processor 217 may maintain a normal mode. In an example, the normal mode may be a mode in which execution of a first function, a second function, and a third function is processed at a normal time point.

According to an embodiment, when the first electronic device 200 is not mounted in the second electronic device 301 and thus does not correspond to a first state in the normal mode, the processor 217 may execute the first function. According to an embodiment, when a temple (e.g., the temple 250 of FIG. 2A) of the first electronic device 200 is in an unfolded state in the normal mode, the processor 217 may execute the second function. In addition, according to an embodiment, when the first electronic device 200 is worn on a user's body in the normal mode, the processor 217 may execute the third function.

For example, according to an embodiment, the processor 217 may maintain the normal mode in which one of the first function, the second function, and the third function is executed at a normal time point when the amount of power of the battery 251 is greater than or equal to the specified value.

According to an embodiment, when the amount of power stored in the battery 251 is less than or equal to the specified value, the processor 217 may start operation 805.

In operation 805 according to an embodiment, the processor 217 may enter a low power mode. In an example, when the amount of power stored in the battery 251 is less than or equal to the specified value, the processor 217 may enter the low power mode. For example, when the identified amount of power of the battery 251 is about 25% and the specified value is about 30%, the processor 217 may enter the low power mode for saving power stored in the battery 251. In an example, the specified value for entering the low power mode has been described as about 30%, but is not limited thereto. For example, the specified value may be about 25%. For another example, the specified value may be about 27%.

In operation 807 according to an embodiment, the processor 217 may execute a function of which an execution time point is adjusted, based on the first state, a folding state, and a second state in the low power mode.

According to an embodiment, the processor 217 may identify the first state, the folding state, and the second state in a state of entering the low power mode.

According to an embodiment, the processor 217 may execute at least one function of which an execution time point is adjusted, based on a result of the identification in operation 809. For example, the processor 217 may not execute, in the low power mode, the first function (e.g., after switching to a second mode (e.g., a wake-up mode), releasing communication with the second electronic device 301 and establishing communication with the third electronic device 302) which is executed when the first electronic device 200 is mounted (e.g., whether in the first state) in the second electronic device 301. In addition, for example, when the temple 250 is in an unfolded state in the low power mode, the processor 217 may execute the first function. In addition, when the first electronic device 200 is worn on the user's body in the low power mode, the processor 217 may execute the first function. In addition, the processor 217 may execute the second function (e.g., switching the display 213 to an on state and activating a sensor) and the third function (e.g. activating a camera and executing a vision algorithm) as well as the first function in the low power mode at an execution time point when the first electronic device 200 is worn on the user's body. That is, the processor 217 executes the first function, the second function, and the third function in the low power mode at an execution time point later than a time point when executed in the normal mode, so that power consumption of the battery 251 can be reduced.

Figure 9:
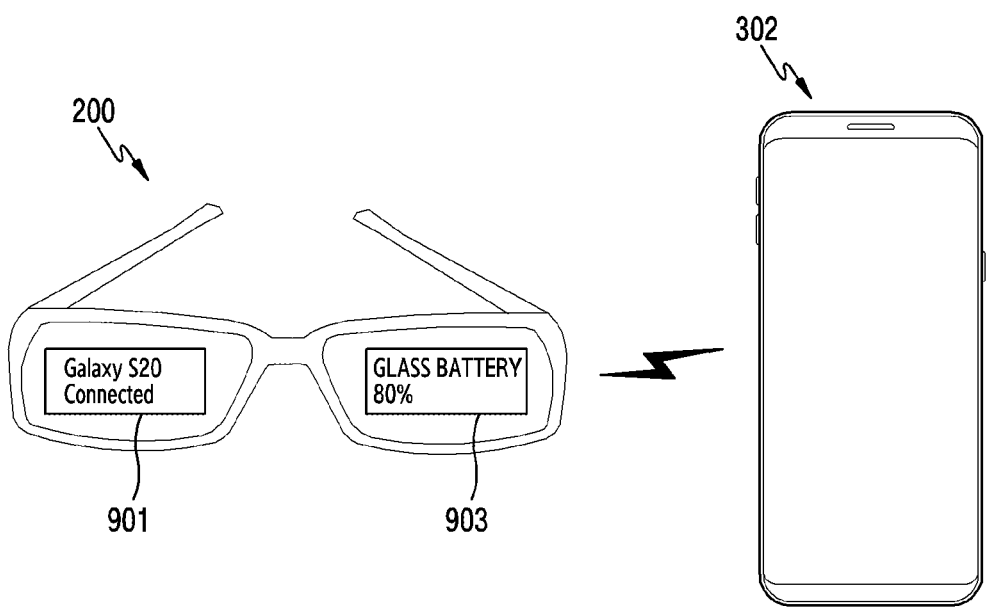
FIG. 9 is a diagram illustrating an example method for displaying a screen on a front part of a display, according to various embodiments.

FIG. 9 is a diagram illustrating an example method for displaying a screen on a front part of the display 213, according to various embodiments.

Referring to FIG. 9, a processor (e.g., the processor 120 of FIG. 1 or the processor 217 of FIG. 2A) of a first electronic device (e.g., the electronic device 101 of FIG. 1 or the first electronic device 200 of FIG. 2A) may display a screen through a front part of a display (e.g., the display module 160 of FIG. 1 or the display 213 of FIG. 2A).

According to an embodiment, the processor 217 may determine whether to display information received from the third electronic device 302, based on a first state and a folding state of the first electronic device 200.

According to an embodiment, the information may include information related to a connection state with the third electronic device 302 and information on the amount of battery power of the third electronic device 302, but is not limited thereto. For example, the information may include information (e.g., a title and a content type) related to a content being displayed on the third electronic device 302, and may include information related to the amount of power stored in the battery 251 of the first electronic device 200.

According to an embodiment, the processor 217 may determine that the first electronic device 200 is mounted in the second electronic device 301, based on the identified first state. When the first electronic device is mounted in the second electronic device 301, the processor 217 may receive power from the second electronic device 301 or transmit at least one of battery information and temperature information of the first electronic device 200 to the second electronic device 301.

According to an embodiment, when the first electronic device 200 is not mounted in the second electronic device 301, the processor 217 may release communication with the second electronic device 301 and establish communication with the third electronic device 302.

According to an embodiment, the processor 217 may identify the folding state after establishing the communication with the third electronic device 302. The processor 217 may identify a folding state of a temple (e.g., the temple 250 of FIG. 2A) connected to a body (e.g., the body 210 of FIG. 2A) through a folding detection sensor (not shown). When the temple 250 is in a folded state, the processor 217 may receive the information from the third electronic device 302 connected through a communication module (e.g., the communication module 219 of FIG. 2A). For example, when the first electronic device 200 is not mounted in the second electronic device 301 and the temple 250 is in a folded state, the processor 217 may receive the information from the third electronic device 302.

According to an embodiment, the processor 217 may output the received information through the front part of the display (e.g., at least one of a left display and a right display) included in the body 210. When the temple 250 is in a folded state, the processor 217 may identify that the first electronic device 200 is not worn on a user's body. Accordingly, the processor 217 may invert image data to the left and right to output the image data to the display 213. In addition, the left-right inversion operation of the image data may output image data previously stored in the first electronic device 200 and output, through the display 213, image data received from the third electronic device 302 connected to the first electronic device 200. For example, the processor 217 may display a model name of the third electronic device 302 and information 901 related to presence or absence of a connection on the right display.

In addition, according to an embodiment, the processor 217 may display information 903 on the amount of power stored in the battery 251 of the first electronic device 200 on the left display.

FIG. 10 is a diagram illustrating an example configuration of a wearable electronic device 1000 according to various embodiments.

In an embodiment, the first electronic device 200 of FIG. 2A may include a part or all of the components configuring the wearable electronic device 1000 of FIG. 10.

In an embodiment, the wearable electronic device 1000 may include a frame 1010 and a leg member 1020. In an embodiment, the leg member 1020 may include a first leg member 1020-R and a second leg member 1020-L.

In an embodiment, the leg member 1020 may be coupled to at least one side of the frame 1010.

In an embodiment, the leg members 1020 may be rotatably connected to the frame 1010 through hinges 1024-L and 1024-R, respectively. The first leg member 1020-R may be rotatably connected to the frame 1010 through a first hinge 1024-R. The second leg member 1020-L may be rotatably connected to the frame 1010 through a second hinge 1024-L.

In an embodiment, the hinges 1024-L and 1024-R of the wearable electronic device 1000 may correspond to the hinge 230 of the first electronic device 200 of FIG. 2A. The leg member 1020 of the wearable electronic device 1000 may correspond to the temple 250 of the first electronic device 200 of FIG. 2A. The frame 1010 of the wearable electronic device 1000 may correspond to the body 210 of the first electronic device 200 of FIG. 2A.

In an embodiment, the body 210 of the first electronic device 200 of FIG. 2A may include the camera 211, the display 213, the sensor 215, the processor 217, and/or the communication module 219, but the frame 1010 of the wearable electronic device 1000 of FIG. 10 may include a camera 1012 and an optical output module 1025, and the leg member 1020 of the wearable electronic device 1000 may include at least one sensor (not shown), a processor (e.g., a PCB 1023 of FIG. 10), and a communication module (not shown).

In an embodiment, the leg member 1020 may include at least one sensor. The at least one sensor may include a proximity sensor, a pressure sensor, and a grip sensor which can detect a folding state of the leg member 1020. The at least one sensor may include a sensor for identifying whether the wearable electronic device 1000 is worn on a user's body, the sensor being different from a sensor for detecting the folding state. For example, the at least one sensor may include an ultrasonic sensor, a grip sensor, and a biometric sensor, and is not limited thereto as long as the same is a sensor capable of determining whether the device is worn on a user's body.

In an embodiment, the first leg member 1020-R may include the first hinge 1024-R, a first printed circuit board (PCB) 1023-R, a first speaker 1022-R, and/or a first battery 1021-R.

In an embodiment, the second leg member 1020-L may include the second hinge 1024-L, a second printed circuit board (PCB) 1023-L, a second speaker 1022-L, and/or a second battery 1021-L.

In an embodiment, the frame 1010 may include a first optical member 1011-R, a first camera 1012-R, a first display member 1015-R, a first microphone 1014-R, a first optical output module 1025-R, a first optical module 1016-R, a third optical module 1017, a first glass sheet 1013-R, a second optical member 1011-L, a second camera 1012-L, a second display member 1015-L, a second microphone 1014-L, a third microphone 1014-C (center), a second optical output module 1025-L, a second glass sheet 1013-L, and a second optical module 1016-L.

An embodiment of the disclosure is not limited to the configuration shown in FIG. 10. For example, the wearable electronic device 1000 may include an optical output module or a display in the leg member 1020.

In an embodiment, the wearable electronic device 1000 may output an image signal by the optical output module 1025 through the first display member 1015-R and the second display member 1015-L.

In an embodiment, "R" and "L" positioned at the end of identification numerals in FIG. 10 may refer, for example, to configurations positioned on the right and left side with reference to a case of being worn.

In an embodiment, the configuration positioned on the right side with reference to a case where the wearable electronic device 1000 is worn may be driven by power output from the first battery 1021-R. The configuration positioned on the left side with reference to a case where the wearable electronic device 1000 is worn may be driven by power output from the second battery 1021-L. In another example, the wearable electronic device 1000 may include only one of the first battery 1021-R and the second battery 1021-L.

Referring to FIG. 10, although configurations (e.g., the first printed circuit board 1023-R, the second printed circuit board 1023-L, the first speaker 1022-R, the second speaker 1022-L, the first battery 1021-R, and the second battery 1021-L) positioned in the first leg member 1020-R or the second leg member 1020-L are shown to be exposed to the outside, this is only for convenience of description, and the configurations may be positioned inside the first leg member 1020-R and/or the second leg member 1020-L and thus may not be exposed to the outside.

In an embodiment, the first optical output module 1025-R and the second optical output module 1025-L may be referred to as the optical output module 1025. The first printed circuit board 1023-R and the second printed circuit board 1023-L may be referred to as a printed circuit board 1023. The first speaker 1022-R and the second speaker 1022-L may be referred to as a speaker 1022. The first optical member 1011-R and the second optical member 1011-L may be referred to as an optical member 1011. The first display member 1015-R and the second display member 1015-L may be referred to as a display member 1015. The first camera 1012-R and the second camera 1012-L may be referred to as a recognition camera 1012. The first optical module 1016-R and the second optical module 1016-L may be referred to as an optical module 1016 for eye tracking (ET). The third optical module 1017 may be referred to as a photographing camera.

In an embodiment, the first camera 1012-R and the second camera 1012-L may recognize a movement and a space of a user's body (e.g., the head or a hand) according to 3 degree of freedom (3DoF) or 6 degree of freedom (6DoF). The first camera 1012-R and the second camera 1012-L may include a global shutter camera. The first camera 1012-R and the second camera 1012-L may perform a simultaneous localization and mapping (SLAM) function through space recognition for 6DoF and depth imaging.

In an embodiment, the first optical module 1016-R and the second optical module 1016-L may detect and track a user's pupil. In the wearable electronic device 1000, the center of a virtual image projected on the first display member 1015-R and the second display member 1015-L may be positioned according to the movement of a pupil of the user wearing the wearable electronic device 1000 tracked through the first optical module 1016-R and the second optical module 1016-L.

In an embodiment, a third camera 1017 may include a high resolution (HR) or photo video (PV) camera. In an example, the third camera 1017 may perform an auto focus (AF) function and an optical image stabilizer (OIS) function. In an example, the third camera 1017 may include a global shutter camera, a color camera, and/or a rolling shutter camera.

In an embodiment, the wearable electronic device 1000 may be a wearable electronic device. For example, the wearable electronic device 1000 may be a wearable electronic device in the form of glasses (e.g., augmented reality glasses (AR glasses), smart glasses, or a head-mounted device). However, this is only an example, and the disclosure is not limited thereto.

In an embodiment, the wearable electronic device 1000 may obtain an image of the real world through the recognition camera 1012 or the photographing camera 1017, and provide, to a user, an augmented reality object (AR object) related to an object (e.g., a thing or a building) included in the obtained image or a location of the obtained image, through the optical output module 1025, the optical member 1011, and a display member 1013.

In addition, the augmented reality object may be received from another electronic device (e.g., a smartphone, a computer, a tablet PC, or a server) and provided to a user through the optical output module 1025, the optical member 1011, and the display member 1013.

In an embodiment, the optical module 1016 may be used to identify eye tracking of a user viewing through the wearable electronic device 1000.

In an embodiment, when the leg member 1020 is folded by a hinge 1024, the wearable electronic device 1000 may stop an operation of the recognition camera 1012, the optical module 1016, or the photographing camera 1017.

In an embodiment, the wearable electronic device 1000 may receive an audio signal through the microphones 1014-R, 1014-L, and 1014-C, and output the audio signal through the speaker 1022.

In an embodiment, the wearable electronic device 1000 may stop outputting sound through the speaker 1022 when the wearable electronic device 1000 is mounted in the case device 1100 of FIG. 11 or the leg member 1020 is folded by the hinge 1024, while sound is output through the speaker 1022.

In an embodiment, the wearable electronic device 1000 may correspond to the first electronic device 200. In an example, the wearable electronic device 1000 may identify a first state, a folding state, and a second state, so that the operations according to FIGS. 4 to 8 may be performed. The first state may include a state in which the wearable electronic device 1000 is mounted in the case device 1100 of FIG. 11. The folding state may include a state in which the leg member 1020 of the wearable electronic device 1000 is folded or unfolded in a specified direction. The second state may include a state in which the wearable electronic device 1000 is worn on a user's body.

In an embodiment, the wearable electronic device 1000 may operate in connection with the third electronic device 302 and/or the case device 1100 of FIG. 11. In another example, the wearable electronic device 1000 may perform the operations according to FIGS. 4 to 8 in a state in which the device is not connected to an external electronic device (e.g., the third electronic device 302 and/or the case device 1100 of FIG. 11).

According to an embodiment, the wearable electronic device 1000 may include the display member 1015 including at least one glass, the frame 1010 which supports at least a part of the glass, the leg member 1020 coupled to one side of the frame 1010, the leg member 1020 including at least one sensor, and at least one processor electrically connected to the at least one sensor, wherein the at least one processor determines whether the wearable electronic device 1000 is in a first state of being mounted in the case device 1100, identifies whether the wearable electronic device 1000 is in a second state of being worn on a user's body through the at least one sensor, and performs a specified function of the wearable electronic device 1000, based on at least one of the first state and/or the second state.

FIG. 11 is a diagram illustrating an example case device 1100 according to various embodiments.

In an embodiment, the case device 1000 of FIG. 11 may be received in the wearable electronic device 1100 of FIG. 10.

In an embodiment, the second electronic device 301 of FIG. 2B may include a part or all of the components configuring the case device 1100 of FIG. 11.

Referring to FIG. 11, the case device 1100 may, for example, and without limitation, have a rectangular parallelepiped shape or a rectangular parallelepiped shape having curved edges, and may include an internal space for receiving the wearable electronic device 1000. For example, the case device 1100 may store the wearable electronic device 1000 in the internal space. It is only an example that the case device 1100 has a rectangular parallelepiped shape, and an embodiment is not limited thereto. For example, when the shape of the case device 1100 includes the internal space for receiving the wearable electronic device 1000, the shape thereof may not be limited.

In an embodiment, the case device 1100 may include a first housing 1110 and a second housing 1120. In an example, the first housing 1110 and the second housing 1120 may be rotatably connected through a hinge module 1101. For example, a user may rotate the first housing 1110 in a first direction, based on the second housing 1120, so as to open the case device 1100 and receive the wearable electronic device 1000 in the internal space, and then rotate the first housing 1110 in a second direction opposite to the first direction, based on the second housing 1120, so as to close the case device 1100.

In an embodiment, the case device 1100 may include the hinge module 1101, a printed circuit board (PCB) 1102, a pogo pin 1103, a battery 1104, a wireless power consortium coil (WPC coil) 1105, and/or a connector 1106.

In an embodiment, the connector 1106 of the case device 1100 may be a configuration provided in a wired interface for receiving power. In an example, the connector 1106 may include a universal serial bus (USB) Type-C structure, but is not limited thereto.

In an embodiment, the case device 1100 may include the battery 1104 and the WPC coil 1105 disposed inside the second housing 1120. In an example, the case device 1100 may receive power through the connector 1106 to charge the battery 1104.

In an embodiment, the case device 1100 may be electrically connected to an external power source (e.g., a wireless charging pad) through the WPC coil 1105.

According to various example embodiments, a first electronic device may include a body including at least one sensor, a temple connected to the body, a hinge connecting the body and the temple and configured to allow the temple connected to the body to be folded in a specified direction within a specified angle, and a processor functionally connected to the at least one sensor, wherein the processor is configured to: determine whether the first electronic device is in a first state of being mounted in a second electronic device, identify whether the first electronic device is in a second state of being worn on, through the at least one sensor, and execute a specified function of the first electronic device, based on at least one of the first state and/or the second state.

According to an example embodiment, the processor may be configured to control the first electronic device to transmit, based on a state of the first electronic device being the first state, at least one of battery information and temperature information of the first electronic device to the second electronic device while maintaining communication with the second electronic device, and based on the state of the first electronic device not being the first state, and based on the first electronic device not being mounted in the second electronic device, execute a first function of switching the first electronic device to a second mode, and releasing a communication connection with the second electronic device to establish communication with a third electronic device.

According to an example embodiment, the body may further include at least one of a circuit and a folding detection sensor, and the processor may be configured to: identify, based on executing the first function, a folding state of the temple through at least one of the circuit and the folding detection sensor or identify the folding state by comparing a specified angle value with a folding angle of the temple.

According to an example embodiment, the circuit may include at least one of an interrupt circuit and a power integrated circuit (IC), and the folding detection sensor may include at least one of a proximity sensor, a grip sensor, and a pressure sensor.

According to an example embodiment, the body may further include a display, and the processor may be configured to identify the folding state to maintain, based on the temple being folded, the first function, and based on the temple being unfolded, execute a second function of switching the display to an on state and activating the at least one sensor.

According to an example embodiment, the body may further include a camera module including a camera, and the processor may be configured to: execute, based on a state of the first electronic device being the second state, a third function of recognizing or tracking an external object via data obtained through the camera module, and based on the state of the first electronic device not being the second state, maintain the second function.

According to an example embodiment, based on the state of the first electronic device not being the second state, the processor may be configured to output an inverted image through the display.

According to an example embodiment, the first electronic device may further include a battery, and the processor may be configured to identify an amount of power of the battery and enter a low power mode based on the amount of power of the battery being less than or equal to a specified value.

According to an example embodiment, the processor may be configured to change an execution time point of the specified function based on the first electronic device entering the low power mode or based on a user configuration.

According to an example embodiment, the first electronic device may further include a charging module including charging circuitry, and based on the first electronic device being mounted in the second electronic device, the processor may be configured to control the first electronic device to charge the battery, based on power received from the second electronic device through the charging module.

According to various example embodiments, a method of operating a first electronic device including a body, a hinge, and a temple may include: determining whether the first electronic device is in a first state of being mounted in a second electronic device; determining whether the first electronic device is in a second state of being worn, through at least one sensor; and executing a specified function of the first electronic device, based on the first state and the second state.

According to an example embodiment, the method may include, based on the first electronic device being in the first state, transmitting battery information and temperature information of the first electronic device to the second electronic device while maintaining communication with the second electronic device, and based on the first electronic device not being in the first state, executing a first function of switching the first electronic device to a second mode, and releasing a communication connection with the second electronic device to establish communication with a third electronic device.

According to an example embodiment, the method may further include: identifying a folding state of the temple of the first electronic device through at least one of a circuit and a folding detection sensor further included in the first electronic device or identifying the folding state by comparing a specified angle value with a folding angle of the temple.

According to an example embodiment, the circuit may include at least one of an interrupt circuit and a power integrated circuit (IC), and the folding detection sensor may include at least one of a proximity sensor, a grip sensor, and a pressure sensor.

According to an example embodiment, the first electronic device may further include a display, and the identifying of the folding state may include, based on the temple being folded, maintaining the first function, and based on the temple being unfolded, executing a second function of switching the display to an on state and activating the at least one sensor.

According to an example embodiment, the first electronic device may further include a camera module including a camera, and the method may include, based on a state of the first electronic device being the second state, executing a third function of recognizing or tracking an external object via data obtained through the camera module, and based on the state of the first electronic device not being the second state, maintaining the second function.

According to an example embodiment, the method may further include, based on a state of the first electronic device not being the second state, outputting an inverted image through the display.

According to an example embodiment, the first electronic device may further include a battery, and the method may include: identifying an amount of power of the battery and entering a low power mode based on the identified amount of power of the battery being less than or equal to a specified value.

According to an example embodiment, the method may include, based on entering the low power mode, changing an execution time point of the specified function.

According to an example embodiment, the first electronic device may further include a charging module including charging circuitry, and the method may include, based on the first electronic device being mounted in the second electronic device, charging the battery, based on power received from the second electronic device through the charging module.

While the disclosure has been illustrated and described with reference to various example embodiments, it will be understood that the various example embodiments are intended to be illustrative, not limiting. It will be further understood to those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A first electronic device comprising:
   a body comprising at least one sensor;
   a temple connected to the body;
   a hinge connecting the body and the temple and configured to allow the temple connected to the body to be folded in a specified direction within a specified angle; and
   a processor, comprising processing circuitry, functionally connected to the at least one sensor, and configured to:
   determine whether the first electronic device is in a first state of being mounted in a second electronic device, and identify whether the first electronic device is in a second state of being worn, through the at least one sensor,
   based on a state of the first electronic device being the first state, control the first electronic device to transmit at least one of battery information or temperature information of the first electronic device to the second electronic device while maintaining a communication connection with the second electronic device, and
   based on the state of the first electronic device not being the first state, execute a first function of switching the first electronic device to a second mode, and releasing the communication connection with the second electronic device to establish communication with a third electronic device.

2. The first electronic device of claim 1, wherein the body further comprises at least one of a circuit and a folding detection sensor, and
the processor is configured to:
based on executing the first function, identify a folding state of the temple through at least one of the circuit and the folding detection sensor or identify the folding state by comparing a specified angle value with a folding angle of the temple.

3. The first electronic device of claim 2, wherein the circuit comprises at least one of an interrupt circuit and a power integrated circuit (IC), and
the folding detection sensor comprises at least one of a proximity sensor, a grip sensor, and a pressure sensor.

4. The first electronic device of claim 2, wherein the body further comprises a display, and
the processor is configured to:
identify the folding state to maintain, based on the temple being folded, the first function, and
based on the temple being unfolded, execute a second function of switching the display to an on state and activating the at least one sensor.

5. The first electronic device of claim 4, wherein the body further comprises a camera module comprising a camera, and
the processor is configured to:
based on the state of the first electronic device being the second state, execute a third function of recognizing or tracking an external object via data obtained through the camera module, and
based on the state of the first electronic device not being the second state, maintain the second function.

6. The first electronic device of claim 4, wherein the processor is configured to output, based on the state of the first electronic device not being the second state, an inverted image through the display.

7. The first electronic device of claim 1, wherein the first electronic device further comprises a battery, and
the processor is configured to identify an amount of power of the battery and enter a low power mode based on the amount of power of the battery being less than or equal to a specified value.

8. The first electronic device of claim 7, wherein the processor is configured to change an execution time point of the specified function based on the first electronic device entering the low power mode or based on a user configuration.

9. The first electronic device of claim 7, wherein the first electronic device further comprises a charging module comprising charging circuitry, and
the processor is configured to control the first electronic device to charge, based on the first electronic device being mounted in the second electronic device, the battery, based on power received from the second electronic device through the charging module.

10. A method of operating a first electronic device comprising a body, a hinge, and a temple, the method comprising:
determining whether the first electronic device is in a first state of being mounted in a second electronic device;
determining whether the first electronic device is in a second state of being worn, through at least one sensor;
based on the first electronic device being in the first state, transmitting at least one of battery information or temperature information of the first electronic device to the second electronic device while maintaining a communication connection with the second electronic device; and
based on the first electronic device not being in the first state, executing a first function of switching the first electronic device to a second mode, and releasing the communication connection with the second electronic device to establish communication with a third electronic device.

11. The method of claim 10, further comprising
identifying a folding state of the temple of the first electronic device through at least one of a circuit and a folding detection sensor further included in the first electronic device, and/or identifying the folding state by comparing a specified angle value with a folding angle of the temple.

12. The method of claim 11, wherein the circuit comprises at least one of an interrupt circuit and a power integrated circuit (IC), and
the folding detection sensor comprises at least one of a proximity sensor, a grip sensor, and a pressure sensor.

13. The method of claim 11, wherein the first electronic device further comprises a display, and
the identifying of the folding state comprises: based on the temple being folded, maintaining the first function; and
based on the temple being unfolded, executing a second function of switching the display to an on state and activating the at least one sensor.

14. The method of claim 13, wherein the first electronic device further comprises a camera module comprising a camera, and
the method comprises:
based on a state of the first electronic device being the second state, executing a third function of recognizing or tracking an external object via data obtained through the camera module; and
based on the state of the first electronic device not being the second state, maintaining the second function.

15. The method of claim 13, further comprising
based on a state of the first electronic device not being the second state, outputting an inverted image through the display.

16. The method of claim 10, wherein the first electronic device further comprises a battery, and
the method comprises:
identifying an amount of power of the battery; and
entering a low power mode based on the identified amount of power of the battery being less than or equal to a specified value.

17. The method of claim 16, comprising
based on entering the low power mode, changing an execution time point of the specified function.

18. The method of claim 16, wherein the first electronic device further comprises a charging module comprising charging circuitry, and
the method comprises, based on the first electronic device being mounted in the second electronic device, charging the battery, based on power received from the second electronic device through the charging module.

* * * * *